United States Patent
Phillips et al.

(10) Patent No.: US 9,488,742 B2
(45) Date of Patent: Nov. 8, 2016

(54) METHOD OF SEISMIC VIBRATORY LIMITS CONTROL AT LOW FREQUENCIES

(71) Applicant: INOVA, LTD., Grand Cayman (KY)

(72) Inventors: Thomas Phillips, Richmond, TX (US); Zhouhong Wei, Sugar Land, TX (US); Ruru Chen, Missouri City, TX (US)

(73) Assignee: INOVA LTD., Georgetown, Grand Cayman (KY)

( * ) Notice: Subject to any disclaimer, the term of this patent is extended or adjusted under 35 U.S.C. 154(b) by 459 days.

(21) Appl. No.: 13/763,415

(22) Filed: Feb. 8, 2013

(65) Prior Publication Data

US 2013/0201789 A1 Aug. 8, 2013

Related U.S. Application Data

(60) Provisional application No. 61/596,676, filed on Feb. 8, 2012.

(51) Int. Cl.
*G01V 1/047* (2006.01)

(52) U.S. Cl.
CPC .................... *G01V 1/0475* (2013.01)

(58) Field of Classification Search
CPC .................................................... G01V 1/0475
USPC .......................................... 367/14, 37, 38, 49
See application file for complete search history.

(56) References Cited

U.S. PATENT DOCUMENTS

| | | | |
|---|---|---|---|
| 4,184,144 A | 1/1980 | Rickenbacker | |
| 4,567,583 A | 1/1986 | Landrum, Jr. | |
| 5,410,517 A * | 4/1995 | Andersen | G01V 1/375 181/108 |
| 7,327,633 B2 * | 2/2008 | Bagaini | G01V 1/005 367/45 |
| 7,330,401 B2 | 2/2008 | Jeffryes et al. | |
| 8,134,891 B2 | 3/2012 | Wei et al. | |
| 8,159,904 B2 | 4/2012 | Bainbridge et al. | |
| 2005/0197781 A1 | 9/2005 | Harmon et al. | |
| 2007/0133354 A1 | 6/2007 | Bagaini et al. | |
| 2009/0238038 A1 | 9/2009 | Bagaini et al. | |
| 2011/0085416 A1 | 4/2011 | Sallas | |
| 2011/0272207 A1 | 11/2011 | Meunier | |

FOREIGN PATENT DOCUMENTS

| | | |
|---|---|---|
| EP | 0795764 A2 | 9/1997 |
| EP | 0927369 A1 | 7/1999 |
| WO | 0161379 A2 | 8/2001 |
| WO | 2009019423 A1 | 2/2009 |

OTHER PUBLICATIONS

PCT/US2013/025416—International Search Report dated Apr. 26, 2013.
European Application No. 13746337.8 dated Nov. 26, 2015.

* cited by examiner

*Primary Examiner* — Daniel L Murphy
(74) *Attorney, Agent, or Firm* — Mossman, Kumar & Tyler, PC

(57) ABSTRACT

A method of performing a seismic sweep determining a user-defined force at a frequency using user defined inputs; determining a maximum force at the frequency using sweep parameters; and using the maximum force to drive a seismic source if the user-defined force is greater than the maximum force.

12 Claims, 3 Drawing Sheets

METHOD OF SEISMIC VIBRATORY LIMITS CONTROL AT LOW FREQUENCIES

CROSS REFERENCE TO RELATED APPLICATIONS

This application claims priority from U.S. Provisional Application Ser. No. 61/596,676 filed Feb. 8, 2012, the disclosure of which is incorporated herein by reference.

BACKGROUND OF THE DISCLOSURE

1. Field of the Disclosure

The present disclosure generally relates to seismic prospecting and in particular to methods and apparatus for generating seismic source signals with enhanced seismic frequency sweeps.

2. Description of the Related Art

In the oil and gas exploration industry, geophysical tools and techniques are commonly employed in order to identify a subterranean structure having potential hydrocarbon deposits. Many different techniques are used to generate a seismic signal.

Seismic vibratory energy sources have been used in the field many years. A seismic vibrator in its simplest form is merely a heavy vehicle that has the ability to shake the ground at a predetermined range of frequencies of about 2 to 100 Hz. The vibrator imparts a signal into the subsurface of the earth over a relatively long period of time, which allows for an energy level less than impulse generators such as dynamite.

The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface.

The seismic vibrator source signal is typically a sweep signal, or simply sweep. Sweeps are sinusoidal vibrations in the 2-100 Hz range described above and having a duration on the order of 2 to 20 seconds depending on the terrain, the subsurface lithology, economic constraints and physical capabilities of the vibrator. The sinusoidal sweep can be increased in frequency over time, which is called an "upsweep." The upsweep is the signal used typically in modern seismic exploration. Also, the sinusoidal sweep can be decreased in frequency over time, which is called a "downsweep." The end products of the vibrator sweep are waves that propagate through the earth to return clues about the subsurface.

The present disclosure provides methods and devices for enhancing seismic sweeps.

SUMMARY OF THE DISCLOSURE

In aspects, the present disclosure provides methods, systems and products related to performing a seismic sweep. The sweep may be performed by determining a user-defined force at a frequency using user defined vibrator control inputs; determining a maximum force at the frequency using sweep parameters; and driving a seismic source at the frequency in dependence upon the maximum force if the user-defined force is greater than the maximum force at the frequency. Driving the seismic source at the frequency in dependence upon the maximum force may be carried out by driving the seismic source at an amplitude derived using the maximum force; or by scaling the maximum force and driving the seismic source at an amplitude derived using the scaled maximum force.

The user-defined force may be determined at a plurality of frequencies, and driving the seismic source may be carried out in dependence upon the maximum force at each frequency where the user-defined force is greater than the maximum force.

System aspects may include at least one processor configured to control a seismic source. The system may also include a seismic source in communication with and configured to respond to one or more of the processor(s). The at least one processor may be configured to implement methods described herein. For example, the processor may be configured to determine a user-defined force at a frequency using user defined vibrator control inputs; determine a maximum force at the frequency using sweep parameters; and drive the seismic source at the frequency in dependence upon the maximum force if the user-defined force is greater than the maximum force at the frequency.

A machine-readable medium product aspect may have instructions thereon, that when executed by at least one processor, cause the processor to perform a method described herein. For example the instructions may be for a method for performing a seismic sweep in an earth formation, comprising determining a user-defined force for a seismic source at a frequency using user defined vibrator control inputs; determining a maximum force at the frequency using sweep parameters; and determining a signal for driving the seismic source, the signal driving the source in dependence upon the maximum force if the user-defined force is greater than the maximum force at the frequency. The product may include further instructions for driving a seismic source according to the signal.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

As will be appreciated from the discussion below, aspects of the present disclosure provide methods of limiting a drive level at each frequency of a frequency sweep using calculated force limits. When driven at low frequencies, the maximum force that can be generated by a seismic source is limited by the reaction mass weight and the maximum distance the reaction mass can travel. If the vibrator control electronics attempt to drive the reaction mass to produce more force, the distance in which the reaction mass can travel will exceed the physical limits and can cause damage to the vibrator. Methods and devices according to the present disclosure may improve the sweep performance and sweep quality (peak and average phase, force, and distortion) by preventing the reaction mass from hitting the stops and thereby creating spikes in phase and distortion.

Figure 1:
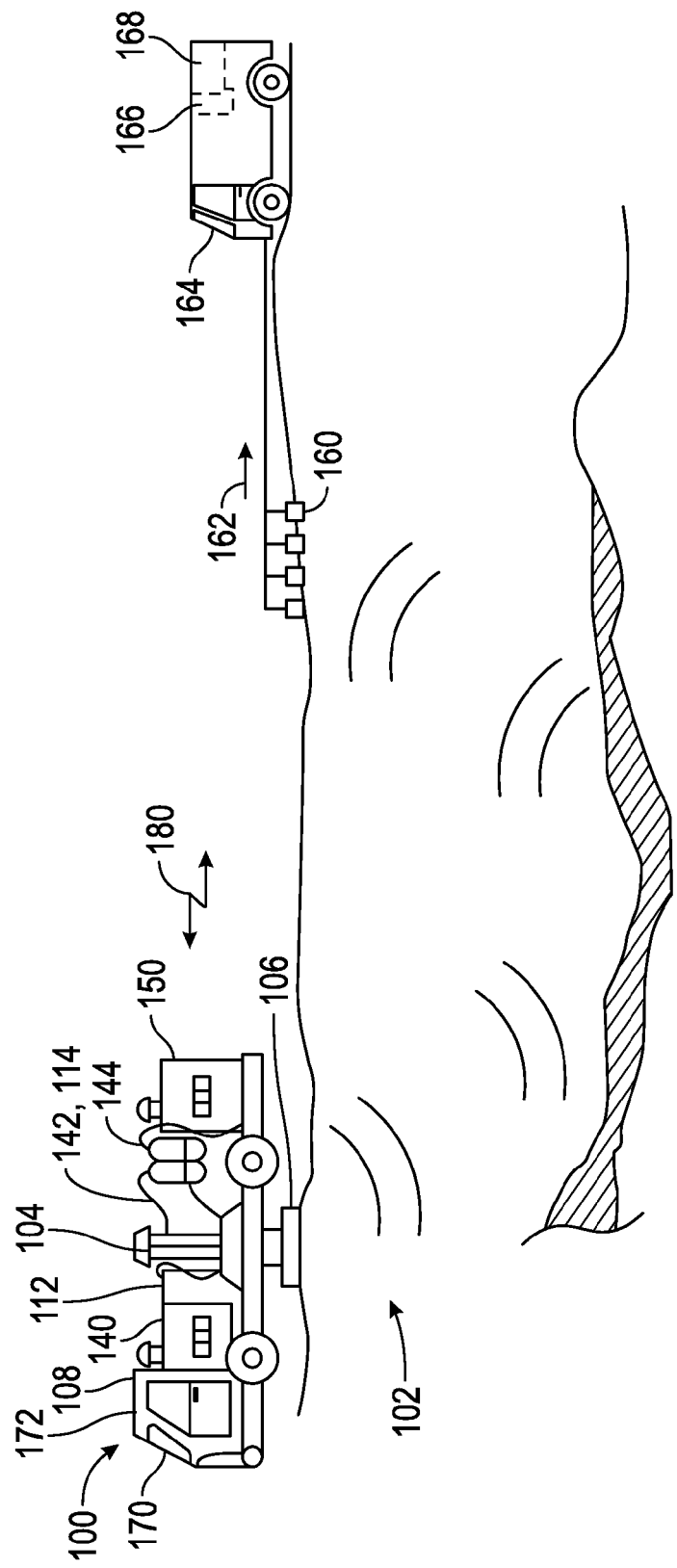
FIG. 1 illustrates a typical seismic data acquisition operation utilizing aspects of the present disclosure.

FIG. 1 depicts a geophysical survey layout that may use target seismic frequency sweeps developed in accordance with embodiments of the present disclosure. A seismic source 100 is positioned at a predetermined location in an area of exploration and coupled to the earth. In the embodiment shown the seismic source 100 is a truck-carried vibratory seismic source. The vibratory seismic source 100 may be a single axis source imparting, for example, only compression P-waves into the earth. Those skilled in the art would recognize that a multi-axis vibratory source capable of imparting both P and S waves into the earth can be configured according to the present disclosure described in detail herein below without additional illustration or description. Therefore, the present disclosure will focus on a single axis seismic source for brevity and without limiting the scope of the disclosure.

The seismic source 100 includes a truck 170 having a cab 172 housing a controller 108. The seismic source includes a hydraulic subsystem 140 used to move a reaction mass 104. As will be described in more detail in reference to FIG. 2, the moving reaction mass 104 acts upon a base plate 106 to impart a seismic source signal 102 into the earth. The signal 102 travels through the earth, reflects at discontinuities and formations, and travels toward the earth's surface.

A plurality of sensors 160 are coupled to the earth in an array spaced apart from the seismic source 100. The sensors 160 detect the reflected source signal 102, and electrical signals 162, which may be digital and/or analog, are transmitted from the array of sensors 160 to a recording station (not shown) typically housed in a truck. The recording station includes a seismic recorder 168 and may also include a correlation processor, which also receives an electrical signal 180 indicative of the actual source signal 102 imparted into the earth.

Still referring to FIG. 1, the seismic source 100 comprises several subsystems having system components used in generating the seismic signal 102. The system 100 includes a hydraulic pump subsystem 140 having hydraulic lines 142 carrying hydraulic fluid 114 to a servo valve assembly 112. A cooler 150 is typically present to cool the hydraulic subsystem. Low frequency accumulators 144 mounted on the truck are relatively large, e.g. about ten gallons or more, and serve to dampen low frequency noise, e.g. about 25 Hz or less, caused by operation of the hydraulic system.

Figure 2:
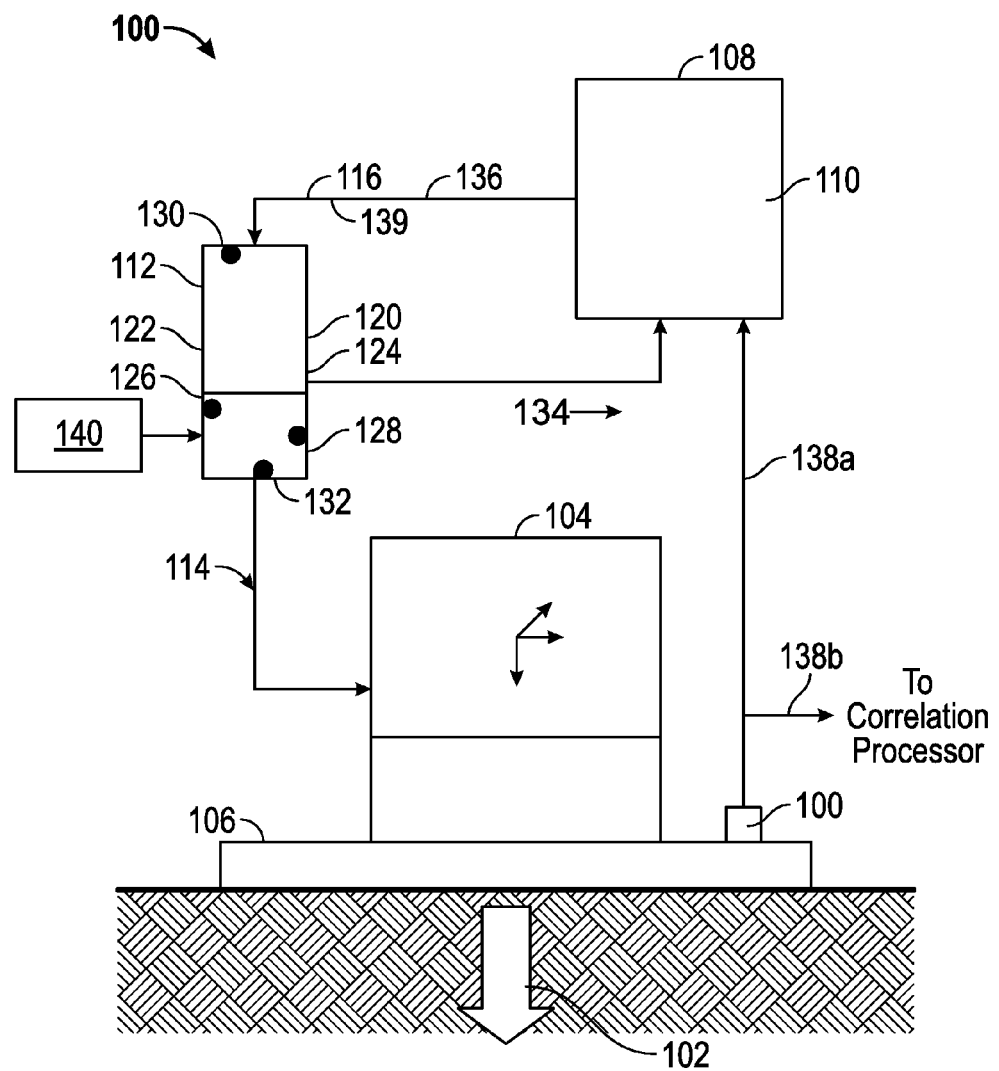
FIG. 2 is a schematic representation of functional features of a vibratory seismic source such as the source of FIG. 1.

FIG. 2 schematically illustrates a seismic signal generating system 100 substantially as described above and shown in FIG. 1 for imparting a sinusoidal seismic signal 102 into the earth. Reference numerals are aligned with the like components of FIG. 1. The base plate 106 is coupled via static weight to the earth. The reaction mass 104 is movably coupled to the base plate 106 such that controlled movement of the reaction mass 104 via the hydraulic subsystem 140 vibrates the base plate 106 at a desired amplitude and frequency or sweep to generate the signal 102. The controller 108 includes a processor 110 for controlling the system 100. The controller is electrically coupled to the servo valve assembly 112. The servo valve assembly 112 includes a servo motor 120, a pilot valve 122 and a main stage valve 124.

The servo valve assembly 112 controls fluid movement in the hydraulic subsystem 140, which provides a force for moving the reaction mass 104. An electrical signal 116 having characteristics of the desired sweep signal is transmitted from the controller 108 to the servo motor, which operates the pilot valve 122. The pilot valve 122 is coupled to the main stage valve 124 and includes a hydraulic coupling for transferring hydraulic pressure to operate the main stage valve. When operated, the main stage valve pressurizes and depressurizes hydraulic passages (not shown) to move the reaction mass 104 according to the controller signal.

In aspects of the disclosure the seismic signal 102 is created by regulating the flow of the pressurized hydraulic fluid 114 against the reaction mass 104, forcing the reaction mass 104 to reciprocate vertically rapidly and repeatedly. Acoustic characteristics of this vibration are controlled by regulating the flow of the hydraulic fluid 114 to adjust the speed and force of the reaction mass 104.

Figure 3:
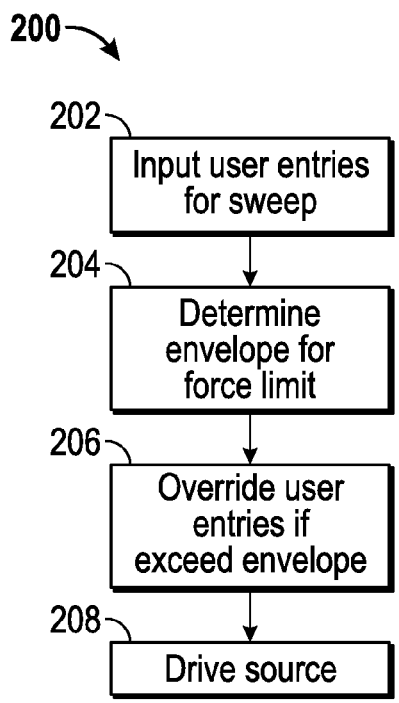
FIG. 3 illustrates a method for generating a composite force profile envelope in accordance with one embodiment of the present disclosure.

Referring now to FIG. 3, there is shown one method 200 for controlling vibratory limits of seismic source 100 (FIG. 1). At step 202, a user may input entries into the vibrator control electronics. These entries may include reaction mass weight and usable reaction mass stroke limits. These entries may be processed to generate amplitudes for operating the seismic source 100 (FIG. 1). At step 204, an information processor (e.g., a microprocessor) associated with the vibrator control electronics may determine the force at each sample based on the sweep parameters such as sweep length, start taper, end taper, drive level, peak output force, hold down weight, start frequency, end frequency, and sweep type. This determination may be output as an "envelope" defining the maximum force at each sample frequency. At step 206, the force associated with the user entries is compared with the force determined at step 204 for each frequency. Specifically, if the force associated with the user entries exceeds the force determined at a particular frequency, then the value determined at step 204 will be applied to over-ride the amplitude of the user's entries at that particular frequency. At step 208, the seismic source 100 (FIG. 1) is driven using the selected amplitude.

In another embodiment, the FIG. 3 method may be used in connection with a software application that allows a user to enter the sweep and vibrator parameters and produces a file or samples of the sweep that are later transmitted to the vibrator control electronics manually, via radio communication (VHF, WiFi, UHF, etc.), or hard wire (USB, Ethernet, RS232, etc.). The sweep and vibrator parameters may be entered into the vibrator control electronics manually, via radio communication (VHF, WiFi, UHF, etc.), or hard wire (USB, Ethernet, RS232, etc.).

The envelope determined at step 204 may be developed using a variety of mathematical models and equations by using experimental/empirical values. In one non-limiting example the equations below may be used to estimate the maximum drive level at each frequency of the frequency sweep.

Displacement Limiting Equations:

$$F = m \times a \quad \text{(Newton's 2}^{nd}\text{ Law)}$$

$$Y = A \times \sin(\omega \times t) \quad \text{(Sinusoidal Displacement)}$$

$$\dot{Y} = A \times \omega \times \cos(\omega \times t) \quad \text{(Sinusoidal Velocity)}$$

$$\ddot{Y} = -A \times \omega^2 \times \sin(\omega \times t) \quad \text{(Sinusoidal Acceleration)}$$

$$F = m \times [-A \times \omega^2 \times \sin(\omega \times t)]$$

To find the maximum fundamental peak force at low frequencies:

$$\text{Max}[\sin(\omega \times t)] = 1, a_{max} = |-A \times \omega^2| = A \times \omega^2$$

$$F = m \times A \times \omega^2$$

m is the mass of the reaction mass, $m_{RM}$
A is the peak amplitude of displacement of reaction mass $$A = \frac{S_{RM}}{2},$$

$S_{RM}$ is the usable stroke
$\omega = 2 \times \pi \times f$, f is frequency $$F = m_{RM} \times \frac{S_{RM}}{2} \times (2 \times \pi \times f)^2$$

Figure 4:
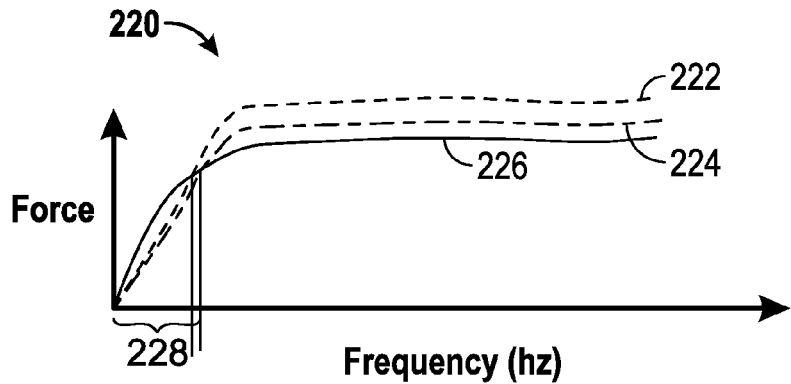
FIG. 4 illustrates a force profile envelope generated using an equation for maximum reaction mass displacement in accordance with one embodiment of the present disclosure.

Referring now to FIG. 4, there is shown a graph 220 for illustrating the FIG. 3 method. The graph 220 shows frequency versus force for an exemplary sweep. Line 226 is a force associated with user defined inputs as determined at step 202. Line 222 is a maximum theoretical force determined at step 204. Line 224 is a line obtained by scaling the line 222 (e.g., 90%). This scaling may be used to introduce a margin of safety to narrow the operating envelope. As can be seen, at the lower frequency region 228, the line 226 exceeds the maximum value of both lines 222 and 224. The region 228 is demarked at the points where either lines 222 or 224 intersect line 226. Thus, the force values of line 222 or line 224 (if a safety margin is desired) are to drive the seismic source 100 in the region 228. Once outside the region 248, the user defined inputs are used to drive the seismic source 100.

Figure 5:
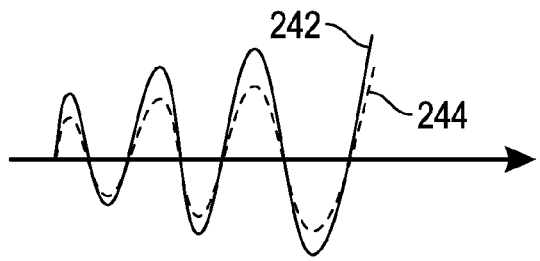
FIG. 5 illustrates a force curve having an amplitude reduced in accordance with one embodiment of the present disclosure.

Referring now to FIG. 5, there is shown a curve 242 illustrating user defined amplitudes and a curve 244 that has been modified using the FIG. 3 method. As should be appreciated, the frequency remains unchanged, but the amplitude has been reduced.

Portions of the present disclosure pertaining to "software aspects" of the disclosure are used herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

The invention claimed is:

1. A method of performing a seismic sweep, comprising:
determining a maximum force of a seismic source at each frequency of the seismic sweep signal using sweep parameters derived from a user-defined seismic sweep signal;
comparing a force associated with the user-defined seismic sweep signal with the determined maximum force at each of the plurality of frequencies;
driving the seismic source according to the determined maximum force if the force of the user-defined seismic sweep signal is greater than the determined maximum force; and
driving the seismic source according to the user-defined seismic sweep signal if the determined maximum force is greater than the force of the user-defined seismic sweep signal.

2. The method of claim 1, further comprising:
determining a scaled maximum force at each frequency of the seismic sweep signal by scaling the determined maximum force by a pre-determined factor; and
wherein driving the seismic source according to the seismic sweep signal comprises driving the seismic source at an amplitude of the scaled maximum force if the force of the user-defined seismic sweep signal is greater than the scaled maximum force at the frequency of the seismic sweep signal.

3. The method of claim 1, wherein the sweep parameters include at least one of: (i) sweep length, (ii) start taper, (iii) end taper, (iv) drive level, (v) peak output force, (vi) hold down weight, (vii) start frequency, (viii) end frequency, and (ix) sweep type.

4. The method of claim 1, further comprising preventing a reaction mass associated with the seismic source from hitting a stop by selecting the determined maximum force.

5. The method of claim 1, wherein the maximum force is using a usable reaction mass stroke limit.

6. A system for performing a seismic sweep in an earth formation using a user-defined seismic sweep signal over a plurality of frequencies using user defined vibrator control inputs, comprising:
a seismic source comprising at least one processor, wherein the at least one processor is configured to:
determine a maximum force of the seismic source at each frequency of the seismic sweep signal using sweep parameters derived from a user-defined seismic sweep signal;
compare a force associated with the user-defined seismic sweep signal with the determined maximum force at each of the plurality of frequencies;
drive the seismic source according to the determined maximum force if the force of the user-defined seismic sweep signal is greater than the determined maximum force; and
drive the seismic source according to the user-defined seismic sweep signal if the determined maximum force is greater than the force of the user-defined seismic sweep signal.

7. The system of claim 6, wherein the at least one processor is further configured to:
determine a scaled maximum force at each frequency of the seismic sweep signal by scaling the determined maximum force by a pre-determined factor; and
wherein driving the seismic source according to the seismic sweep signal comprises driving the seismic source at an amplitude of the scaled maximum force if the force of the user-defined seismic sweep signal is greater than the scaled maximum force at the frequency of the seismic sweep signal.

8. The system of claim 6, wherein the sweep parameters include at least one of: (i) sweep length, (ii) start taper, (iii) end taper, (iv) drive level, (v) peak output force, (vi) hold down weight, (vii) start frequency, (viii) end frequency, and (ix) sweep type.

9. A non-transitory machine-readable medium product with instructions thereon, that when executed by at least one processor, causes the processor to perform a method for performing a seismic sweep in an earth formation, comprising:

determining a maximum force of a seismic source at each frequency of the seismic sweep signal using sweep parameters derived from a user-defined seismic sweep signal;

comparing a force associated with the user-defined seismic sweep signal with the determined maximum force at each of the plurality of frequencies; and determining a signal for driving the seismic source according to the seismic sweep signal in dependence upon the comparison.

10. The machine-readable medium product of claim 9, further comprising instructions thereon for determining a scaled maximum force at each frequency of the seismic sweep signal by scaling the determined maximum force by a pre-determined factor; and wherein driving the seismic source according to the seismic sweep signal comprises driving the seismic source at an amplitude of the scaled maximum force if the force of the user-defined seismic sweep signal is greater than the scaled maximum force at the frequency of the seismic sweep signal.

11. The machine-readable medium product of claim 9, wherein the sweep parameters include at least one of: (i) sweep length, (ii) start taper, (iii) end taper, (iv) drive level, (v) peak output force, (vi) hold down weight, (vii) start frequency, (viii) end frequency, and (ix) sweep type.

12. The machine-readable medium product of claim 9, further comprising instructions thereon for driving the seismic source according to the signal.

* * * * *